United States Patent [19]
Mizuno et al.

[11] Patent Number: 5,930,817
[45] Date of Patent: Jul. 27, 1999

[54] METHOD AND SYSTEM INCLUDING OPERATION INFORMATION ACCESSIBLE BY A SYSTEM ON A NETWORK UTILIZING A FILE ACCESS COMMAND OF A HOST OPERATING SYSTEM

[75] Inventors: Masahiro Mizuno; Shiro Ogura; Kazuhiko Ito; Hitoshi Yamamoto; Kazuo Ito; Hiroshi Baba, all of Tokyo, Japan

[73] Assignee: Mitsubishi Denki Kabushiki Kaisha, Tokyo, Japan

[21] Appl. No.: 08/731,968

[22] Filed: Oct. 23, 1996

[30] Foreign Application Priority Data

Mar. 29, 1996 [JP] Japan .................................. 8-076483

[51] Int. Cl.⁶ ..................................................... G06F 12/00
[52] U.S. Cl. .................... 711/114; 395/200.43; 395/681; 711/112
[58] Field of Search ..................... 711/113, 114, 711/112; 395/681, 200.43, 200.46

[56] References Cited

U.S. PATENT DOCUMENTS

| | | | |
|---|---|---|---|
| 5,265,252 | 11/1993 | Rawson, III et al. | 395/681 |
| 5,440,716 | 8/1995 | Schultz et al. | 711/114 |
| 5,459,867 | 10/1995 | Adams et al. | 395/681 |
| 5,465,364 | 11/1995 | Lathrop et al. | 395/681 |
| 5,548,783 | 8/1996 | Jones et al. | 395/836 |
| 5,623,696 | 4/1997 | Johnson et al. | 395/681 |
| 5,638,517 | 6/1997 | Bartek et al. | 395/200.76 |
| 5,680,586 | 10/1997 | Elkins et al. | 395/682 |

FOREIGN PATENT DOCUMENTS

| | | |
|---|---|---|
| 0 369 708 | 5/1990 | European Pat. Off. . |
| 1-66729 | 3/1989 | Japan . |
| 1-175022 | 7/1989 | Japan . |
| 3-208142 | 9/1991 | Japan . |
| 5-181735 | 7/1993 | Japan . |
| 5-298172 | 11/1993 | Japan . |

*Primary Examiner*—Glenn Gossage
*Attorney, Agent, or Firm*—Burns, Doane, Swecker & Mathis, LLP

[57] ABSTRACT

A data storage managing system and method in which a HOST system obtains operation information of a storage device from a system connected to a network without the need for a specific device driver are disclosed. When disks shared between systems connected to the network are managed by a disk manager, monitoring and control information for the shared disks may be accessed by a file access command of the operating system on the HOST system. An operation information storage device is formed in a file format which can be accessed by a file access command of the operating system on the HOST system and the HOST system reads the operation information of the storage devices stored in the operation information file according to the file access command. The information to control the operation of the storage devices is written in the operation information file according to the file access command. The disk manager controls the operation of the storage devices according to the operation information of the operation information file.

20 Claims, 18 Drawing Sheets

Fig. 4

| TABLE NAME | READ OR WRITE FROM HOST SYSTEM |
|---|---|
| DISK ENCLOSURE DIRECTORY TABLE 1 | READ |
| DISK ENCLOSURE DIRECTORY TABLE 2 | READ |
| DISK ENCLOSURE DATA TABLE 1 | READ / WRITE |
| DISK ENCLOSURE DATA TABLE 2 | READ |
| RAID SYSTEM INFORMATION TABLE | READ / WRITE |
| RAID SYSTEM CONFIGURATION TABLE | READ / WRITE |
| RAID CONTROL BLOCK | READ / WRITE |
| RAID CONTROL STATUS | READ |
| LOG TABLE | READ |

| 00:No exist |
| 01:Disk Unit(Swap SW OFF) |
| 11:Disk Unit(Swap SW ON) |
| 02:Dummy Unit |
| 04:SCSI BUS Extend |
| 08:Disk Manager |

| 01:RAID SYSTEM EXIST |
| 02:RAID SYSTEM NOT EXIST |

| 00:RAID NORMAL CONDITION | NORMAL OPERATION |
|---|---|
| 01:RAID REDUCE CONDITION | REDUCE OPERATION DUE TO ONE FAULTY DISK |
| 02:RAID REPAIR CONDITION | DATA RECONSTRUCTION |
| 03:RAID FAIL CONDITION | FAIL OPERATION DUE TO TWO FAULTY DISKS |

Fig.14

(A) OPEN "ERROR.LOG"

(B) OPEN "COMMAND.FIL"

```
         ┌─────────────────┐ ~ 23g
         │  COMMAND AREA   │
         ├─────────────────┤   (4C)
         │                 │
         │                 │    ↑ ── Swap COMMAND
         │                 │
         │                 │
         └─────────────────┘
```

CLOSE "COMMAND.FIL"

(C) OPEN "COMMAND.FIL"

(D) OPEN "COMMAND.FIL"

```
         ┌─────────────────┐ ~ 23g
         │  COMMAND AREA   │
         ├─────────────────┤   (4E)
         │ Group No. (2byte)│
         ├─────────────────┤    ↑ ── Spin Up COMMAND
         │ Path  No. (2byte)│
         ├─────────────────┤
         │ SPACE  (506byte) │
         └─────────────────┘
```

CLOSE "COMMAND.FIL"

METHOD AND SYSTEM INCLUDING OPERATION INFORMATION ACCESSIBLE BY A SYSTEM ON A NETWORK UTILIZING A FILE ACCESS COMMAND OF A HOST OPERATING SYSTEM

BACKGROUND OF THE INVENTION

1. Field of the Invention

The present invention relates to a management system for monitoring a memory system placed in a network. More specifically, the present invention relates to a system which can freely access monitor information from a system connected to the network by eliminating a special function of the Operating System (OS) for accessing monitor information or a specific device driver to be used when the monitor information is accessed.

2. Description of the Related Arts

In case of managing disks which are shared between systems connected to a network, software dedicated to manage the shared disks is conventionally installed in the operating system of a HOST system, along with the device driver. For example, FIG. 18 shows the structure of a conventional data storage system. In FIG. 18, HOST system 2 has a dedicated device driver 2a for controlling a disk manager 1 and is connected to a data storage system 8 through a PCI BUS 11. The data storage system 8 includes shared disks composed of a Redundant Array of Inexpensive Disks (RAID). Storage disks 6 are the shared disks and disk manager 1 monitors and controls overall operation. Storage disks 6 are controlled by a disk controller 3, which is a RAID Control Board. The disk manager 1 collects the operation information for each storage disk from the disk controller 3 and storage disks 6. Then, the collected information is stored in a memory provided by the disk manager 1. FIG. 19 shows a detailed illustration of the memory. The device driver 2a dedicated to the control of the disk manager 1 is connected within the HOST system 2 in advance. When the operation information is obtained by the HOST system 2, the disk manager memory is accessed through the device driver 2a. The HOST system 2 instructs the device driver 2a to retrieve the operation information for the storage disks 6. Then, the device driver 2a retrieves the operation information for the storage disk 6 by accessing the memory of the disk manager 1. The HOST system 2 obtains the operation information for the storage disks 6 by receiving the operation information retrieved through the device driver 2a.

FIG. 19 shows an example of operation information stored by the disk manager. As shown in FIG. 19, the operation information is composed of ten blocks. Block Addresses 0 to 7 are blocks for Read and Block Addresses 8, 9 are blocks for Write. Block Addresses 0 to 9 are, small computer system interface (SCSI) Blocks. Each SCSI Block is accessible from the SCSI bus 12 and is stored in a static random stored access memory (SRAM) of the disk manager 1. Actually, data is stored in a Status Table in the SRAM of the disk manager 1. Operation information for each storage disk 6 and a fan 7 is transmitted through a Serial bus 14. The disk manager 1 then writes the transmitted operation information on the Status Table. In addition, operation information for a RAID System, RAID level information, and operation information for disks connected to the RAID system are transmitted to the disk manager 1 through a RAID system (RS) Port 13. The disk manager 1 writes the transmitted operation information in the Status Table. The disk manager 1 also extracts the requisite information requested by the inquiry from the device driver 2a provided by the HOST system 2, from Block Addresses 0 to 7, and transmits the information to the HOST system 2 through the device driver 2a. The status table may also be provided independent of the SCSI Blocks. In this case, the Status Table is pointed to by information stored in the SCSI Blocks.

A conventional disk manager 1 stores information from monitoring the operation of the storage and RAID system in the Status Table in the SRAM. However, the HOST system 2 needs a device driver 2a dedicated to the control of the disk manager to access the Status Table. Therefore, the following problem is caused.

When the operating system of the HOST system is changed, the device drivers are replaced. Then, modification of the device driver is required even when the device driver does not need to be replaced.

When the HOST system is connected by a network, a problem occurs because the monitor information is not able to be accessed directly from other systems connected to the network.

Also, when a fault occurs in a data storage system, data stored in the Status Table may be lost.

Furthermore, since the disk manager 1 has the Status Table, when the number of storage devices increase and the scale of the data storage system is enlarged, the size of the Status Table is enlarged and the load on the disk manager 1 increases.

SUMMARY OF THE INVENTION

The present invention solves the foregoing and other problems through use of a data storage management system.

According to one embodiment of the present invention, the HOST system obtains operation information for the storage devices without using a specific device driver.

The operation information for the storage devices is obtained without need of the operating system of the HOST system. As a result, the operation information is easily obtained from other systems in the network.

Furthermore, operation information for the storage devices may be stored not only in the disk manager but also in the storage devices themselves. Without using a device driver, access from the HOST system can be actualized.

According to the present invention, it is possible to access the stored operation information based on a file access command of the operating system on the host system. Conventionally, a special device driver would be used for accessing the stored operation information. However, based on the present invention, use of a special device driver can be omitted. According to the present invention, the HOST system is able to easily perform the operation management of the storage devices.

According to the present invention, the stored operation information exists at least in a part of one of the storage devices. Therefore, if the storage device for storing the operation information has not been specially prepared, a storage device already connected to the host system can be used.

According to the present invention, a device which stores the operation information (hereinafter referred to as "the operation information storage device") is connected with the storage or disk device manager. Therefore, if the storage system already has a disk manager, it is possible to implement the data storage managing system by replacing the existing disk or storage device manager with the disk or storage device manager according to the present invention.

According to the present invention, the operation information storage device stores control information to control the operation of the storage devices. Therefore, the host system can write the control information to control the operation of the storage devices in the operation information storage device.

According to the present invention, the host system extracts the operation information from the operation information storage device based on a file access command of the operating system on the host system. It is possible to write the control information to control the operation of the storage devices in the operation information storage device in accordance with a file access command. Conventionally, a special device driver for accessing the operation information storage device would be prepared for the HOST system. However, in the present invention, the host system can access the operation information storage device by using a file access command of the operating system.

According to the present invention, the operation information storage device has an area dedicated to a read operation or an area dedicated to a write operation, in response to the access command from the host system. Therefore, it is possible to prevent data from being destroyed by an undesirable access from the host system. Additionally, it is possible to prevent destroyed data from being improperly read.

According to the present invention, if the host system writes the control information to control the operation of the storage devices in the operation information storage device, it is possible for the storage device manager to execute operational control of the storage devices.

According to the present invention, the local system instructs the host system that the operation information storage device should be accessed. Therefore, if each of the operating systems of the local system and the operating system of the host system are different, the local system can access the operation information storage device through the host system by using a file access command in accordance with the operating system of the local system itself.

According to the present invention, the host system accesses the operation information storage device based on an instruction from the local system. Therefore, when each of the operating systems of the local system and the operating system of the host system are different, the local system can access the operation information storage device by either a file access command of the operating system on the local system or by a file access command of the operating system on the host system.

According to the present invention, it is possible to extract the operation information from the operation information storage device by using a file access command of the operating system on the local system through the host system. Therefore, it is possible for the local system to easily control the operation of the storage devices.

According to the present invention, the storage device manager writes the result of controlling the operation of the storage devices based on the control information written in the operation information storage device. Therefore, the host system can determine the result of controlling the operation of the storage devices by accessing the operation information storage device.

According to the present invention, the operation information storage device can have a file format which can be accessed according to Microsoft Disk Operating System (MS-DOS, Registered Trademark of Microsoft Corporation, Seattle, Wash.). Therefore, it is effective in that the host system can access the operation information storage device so as to access the formatted file based on the MS-DOS file format of MS-DOS. Then, by inputting an MS-DOS file and using an editing tool, it is possible for the HOST system to easily monitor the operation information storage device.

According to the present invention, the operation information storage device can have a file format which can be accessed by UNIX (registered Trademark of Novell, Inc., Provo, Utah). Therefore, it is possible for the host system to access the operation information storage device to access the file formatted based on the UNIX file format. Then, by using an editing tool and inputting a UNIX file, it is possible for the HOST system to easily monitor the operation information storage device.

According to the present invention, the operation information storage device is a non-volatile memory. Therefore, the HOST system can write the information to control the operation of the storage devices and access the operation information for the storage devices by accessing the non-volatile memory.

According to the present invention, the operation information storage device stores a SCSI block in a file format. Therefore, the host system can write the information to control the operation of the storage devices and obtain the operation information by accessing the operation information storage device in SCSI block units.

According to the present invention, the data storage managing method includes the step of storing information for monitoring and controlling the operation of the storage devices by the storage device manager in a file format which can be accessed by a file access command of the operating system on the host system. Then, the host system can access the operation information storage device according to a file access command of the operating system on the host system. Therefore, the host system can access the operation information storage device without using a special device driver.

According to the present invention, the data storage managing method includes the steps of extracting the monitor information of the storage devices by accessing the operation information storage device and writing the control information for the storage devices in the operation information storage device. Therefore, the host system creates control information to control the operation of the storage devices from the extracted monitor information and can write the control information in the operation information storage device.

According to the present invention, the data storage managing method includes a step of accessing the operation information storage device through a communication line according to a fixed file access command by the local system. Therefore, the local system can access the operation information storage means without using a special device driver.

According to the present invention, the data storage managing method includes the steps of extracting the monitor information for the storage devices by accessing the operation information storage device through the host system and writing the control information for the storage devices in the operation information storage device through the host system. Therefore, the local system can write the control information to control the operation of the storage devices and extract the managing information for the storage devices from the operation information storage device through the HOST system by using a file access command of the operating system of the local system itself without using a special device driver.

According to the present invention, the storage device manager includes a step of controlling the operation of the storage devices based on control information written in the operation information storage device. Therefore, the host system and the local system can execute control operations through use of the storage device manager by writing control information for the storage devices in the operation information storage device.

According to one aspect of this invention, a data storage managing system may include:

(a) a host system for executing an operating system having a file access command;

(b) at least one storage device for storing data, connected to the host system through an interface;

(c) a storage device manager for controlling operation of the at least one storage device and for collecting operation information by monitoring a condition of the at least one storage device; and (d) an operation information storage device for storing the operation information collected by the storage device manager in a file format capable of being accessed by a file access command of the operating system of the host system.

According to another aspect of this invention, in a system in which a host system and a storage device manager are connected and the storage device manager and at least one storage device are connected, for managing the at least one storage device and storing monitor information in an operation information storage device, a data storage managing method may include steps of:

(a) monitoring and controlling operation of the at least one storage device by the storage device manager;

(b) storing information by which the storage device manager monitors and controls the operation of the at least one storage device in the operation information storage device in a file format which can be accessed by a file access command of an operating system of the host system;

(c) accessing the operation information storage device according to the file access command of the operating system in the host system.

BRIEF EXPLANATION OF THE DRAWINGS

FIG. 4 shows access operations from the HOST system to a table which constitutes the operation information file;

FIG. 5 shows an example of data stored in the disk enclosure data table 2;

FIG. 6A shows an example of data stored in the RAID system Information table;

FIG. 6B shows another example of data stored in the RAID system Information table;

FIG. 14 shows an example of command for accessing a file in the operation information file from the HOST system;

DETAILED DESCRIPTION

According to a first embodiment of the invention, there is shown a case where the operation information storage device has a file format which can be accessed by a file access command of the operating system in a host system.

Figure 1:
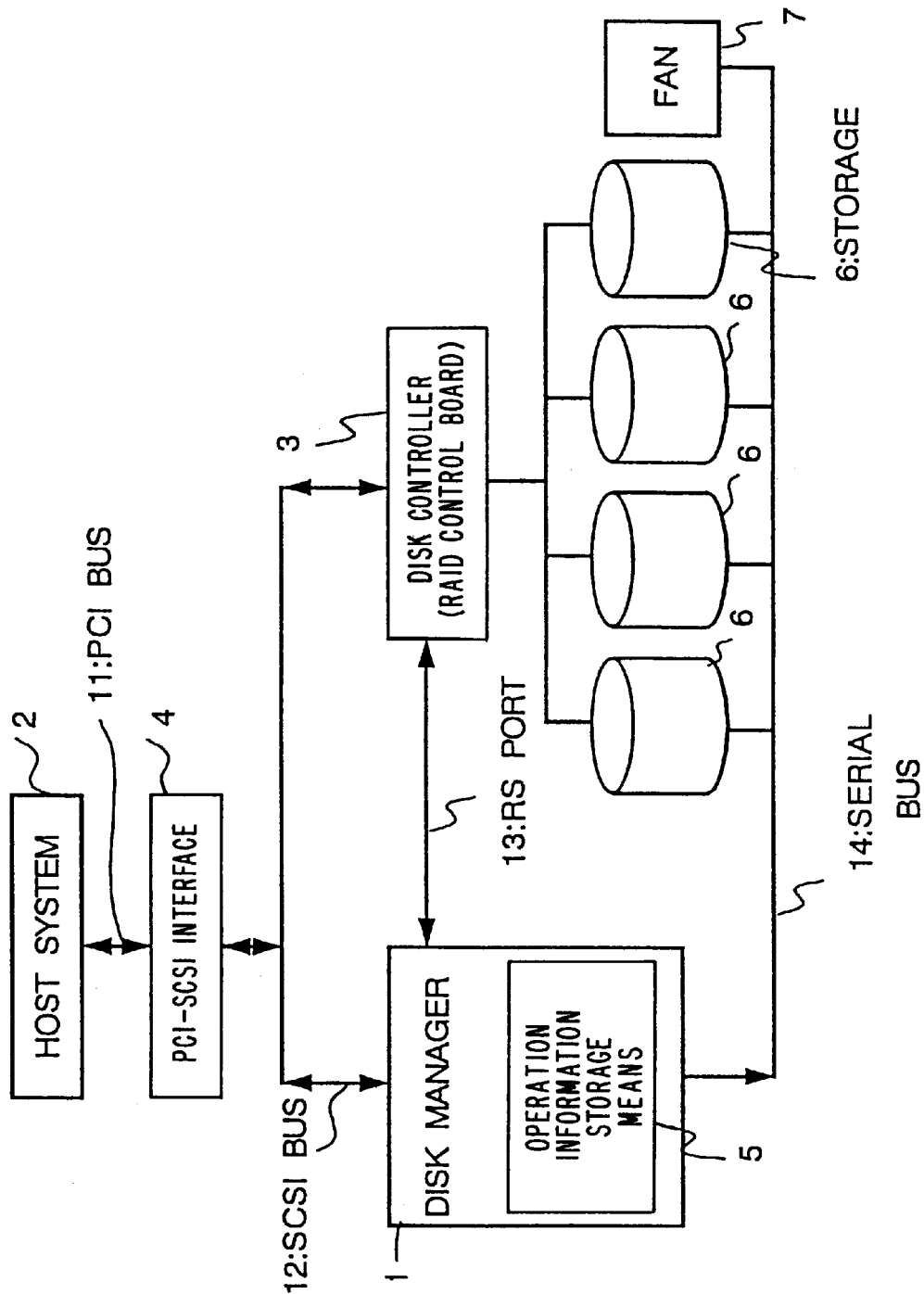
FIG. 1 shows an example of a system configuration which realizes a data storage system managing system of the present invention.

FIG. 1 shows an example according to the first embodiment of a system configuration which realizes a data storage managing system according to the present invention. In FIG. 1, a HOST system 2 uses MS-DOS (MS-DOS is a registered trademark of Microsoft Corporation) as an operating, system OS. Further, through a PCI-SCSI interface 4, the HOST system 2 is connected to a disk or storage device manager 1 and a disk controller 3, which is a RAID Control Board. A PCI bus 11 connects the HOST system 2 and the PCI-SCSI interface 4. A SCSI bus 12 connects the PCI-SCSI interface 4 and the disk manager 1. An RS Port 13 connects the disk manager 1 and the disk controller 3. The disk controller 3 according to this embodiment is connected to four storage devices 6 and a fan 7. The storage devices 6 have a RAID configuration. The disk manager 1 connects the four storage devices 6 and a fan 7. The disk manager 1 also monitors and controls the operation of these storage devices 6 and the fan 7. In addition, the disk manager 1 stores information collected by monitoring the operation of the four storage devices 6 and the fan 7 through the Serial bus 14 in an operation information storage device 5. The information used to control the operation of the storage devices 6 and the fan 7 is stored in the operation information storage device 5. According to this embodiment of the invention, the operation information storage device 5 is provided in the disk manager 1 and composed of an SRAM. The monitored information of the operation of the storage devices 6 is transmitted through the RS Port 13 from the disk controller 3 to the disk manager 1. The disk manager 1 stores information from the disk controller 3 in the operation information storage device 5. A RAID Control Board is used as the disk controller 3. However, other types of control boards can be used.

Figure 2:
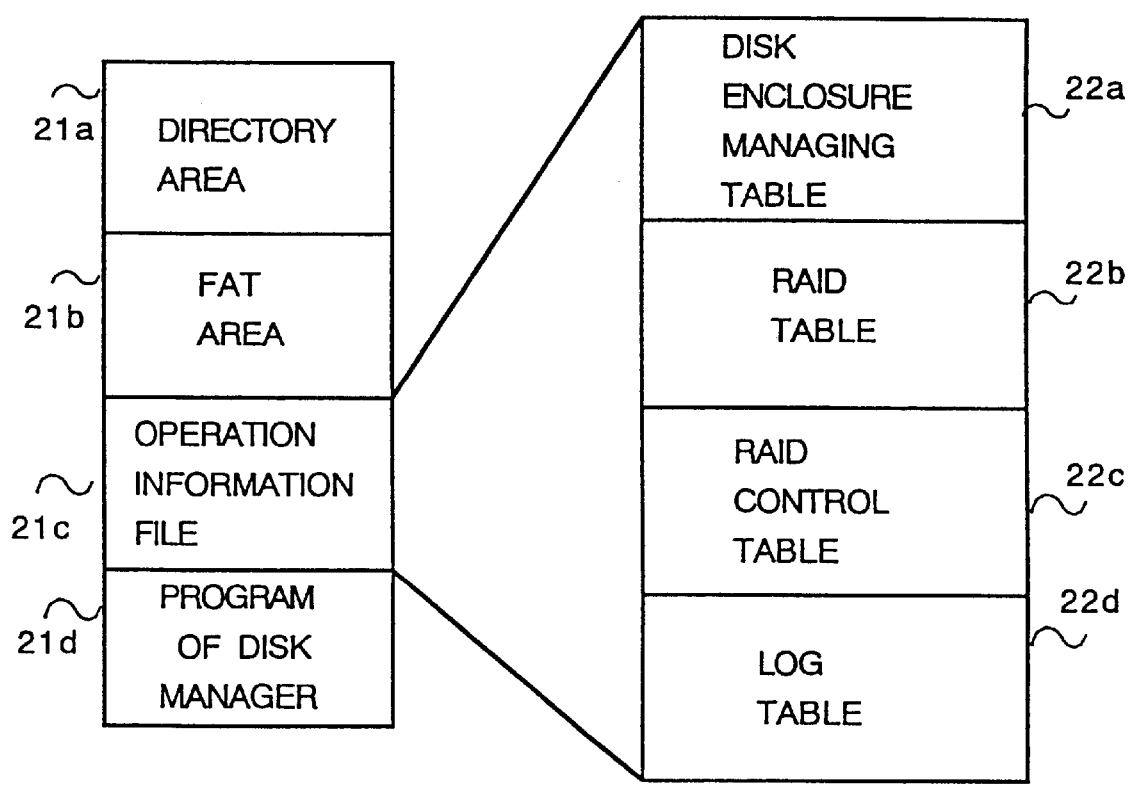
FIG. 2 shows a view of a file configuration of the operation information storage device.

A file configuration of the operation information storage device 5 will now be explained in connection with FIG. 2. FIG. 2 shows a file configuration of the operation information storage device. In FIG. 2, the operation information storage device 5 is composed of a directory area 21a, a FAT (File Allocation Table) area 21b, an operation information file 21c and a program of the disk manager 21d. Thus, by the operation information storage device 5 having the directory area 21a and the FAT area 21b, the HOST system 2 can access the operation information file 21c in the operation information storage device 5 as a standard file of MS-DOS according to an operating system on the HOST system. The operation information file 21c is composed of a disk enclosure managing table 22a, a RAID table 22b, a RAID control table 22c and a log table 22d.

With reference to FIGS. 3 to 13, there are shown explanations of detailed data stored in each of tables 22a to 22d of FIG. 2.

Figure 3:
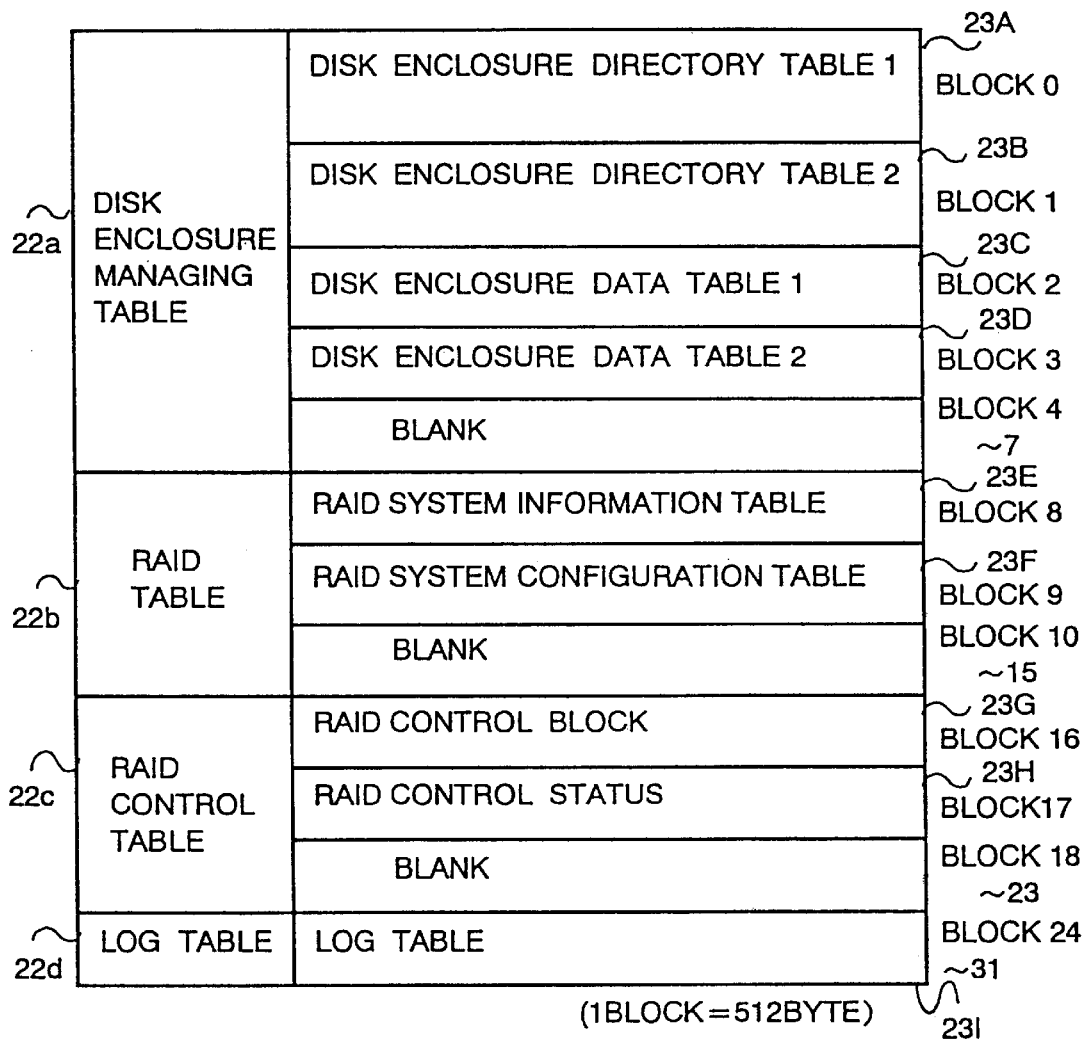
FIG. 3 shows a block configuration of an operation information file of the system shown in FIG. 1.

FIG. 3 depicts a block configuration of the operation information file 21c.

In FIG. 3, the disk enclosure managing table 22a is composed of a disk enclosure directory table 1 23a, a disk enclosure data table data table 2 23b, a disk enclosure directory table 1 23c and a disk enclosure data table 2 23d. The disk enclosure managing table 22a stores information regarding whether a particular disk unit (i.e., storage device) is mounted for each unit of the storage devices 6, information showing an operation status of the disk unit, information of ON/OFF of Swap SW (Switch) being provided by each unit which causes that unit to be mounted and information of light emitting diodes (LED) being provided by each unit indicating whether that particular storage device 6 is mounted.

A RAID table 22b is composed of a RAID system Information table 23e and a RAID system Configuration table 23f. The RAID control table 22c is composed of a RAID control Block 23g, a RAID control Status 23h, and a blank area. The RAID table 22b stores a reconstructing condition of data, faults occurring in a disk unit, the RAID level, etc.

The RAID control table 22c stores information required for operation control of the RAID system. The log table 22d is composed of a log table 23i.

The log table 22d is a table for storing the operation status of RAID system historically.

The operation information storage device 5 can be accessed as a standard file of MS-DOS from the HOST system 2. Therefore, the size of each of tables 22a to 22d is 4K bytes according to this embodiment. Each of the tables 23a to 23i is separated in blocks of 512 bytes (the block is a SCSI Block to be accessed by the SCSI bus 12). The operation information file 21c is composed of 32 blocks numbered Blocks 0 to 31. Blank Blocks for adjusting the size of the RAID control table 22c are provided and the size of each of the tables 22a to 22d is adjusted to be 4K bytes.

FIG. 4 shows access operations from the HOST system to tables 23a to 23i which constitutes the operation information file. As shown in FIG. 4, a read operation from the HOST system 2 is possible to all of the tables 23a to 23i. A write operation from the HOST system 2 is possible to a disk enclosure data table 1 23c, a RAID system Information table 23e, a RAID system configuration table 23f and a RAID control Block 23g.

The HOST system 2 reads each of tables 22a to 22d (FIG. 3) in the operation information storage device 5 as one file by using a file access command of the operating system in the HOST system 2. When a write operation is performed, the corresponding table is read out and the appropriate data of the data values in the read out table is modified and then the corresponding table is rewritten (this is called Read Modify Write). With reference to FIGS. 5 to 13, examples of information to be stored in a disk enclosure data table 2 23d to log table 23i are shown.

The disk manager 1 receives information, shown in FIG. 5, showing a state of the unit which mounts one of the storage devices 6 from the group of storage devices 6 through the Serial bus 14. The above information is stored in a disk enclosure data table 2 23d of the operation information storage device 5 (shown in FIG. 1). The disk manager 1 also receives information, shown in FIG. 6A, indicating if the RAID system of FIG. 1 is connected, and information, shown in FIG. 6B, of the operation status of the RAID system. The connection information and the status information is received from the disk controller 3 through the RAID system (RS) Port 13. The information is then stored in a RAID system Information table 23e of the operation information storage device 5. For example, when the RAID system is disconnected, the HOST system 2 reads a RAID table 22b and changes data of Block 8, which is a RAID system Information table 23e, from RAID system exist ('01') to RAID system Not Exist ('02'). Then, the RAID table 22b is rewritten in the operation information storage device 5. Thus, the RAID system can be disconnected virtually.

Figure 7A:
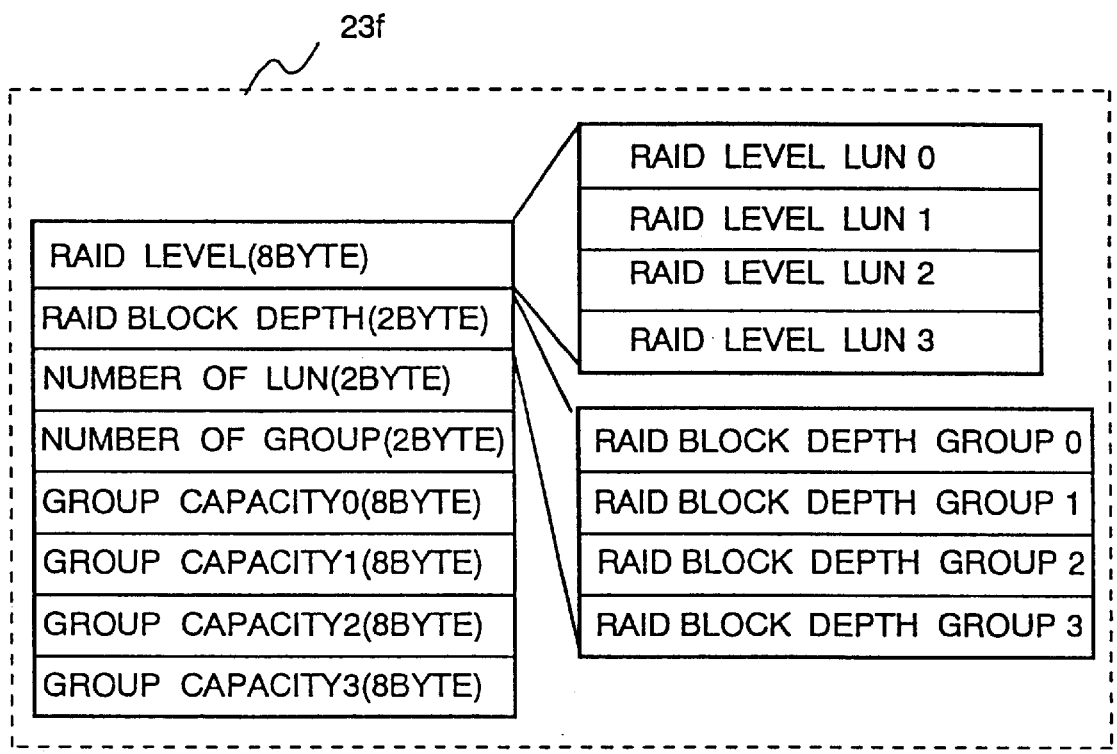
FIG. 7A shows an example of data stored in the RAID system Configuration table.
Figure 7B:
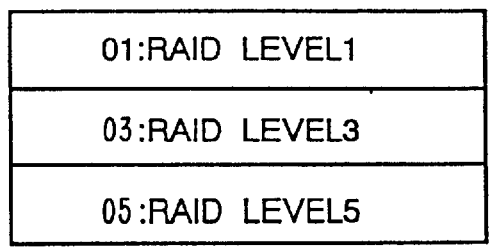
FIG. 7B shows another example of data stored in the RAID system Configuration table.
Figure 8:
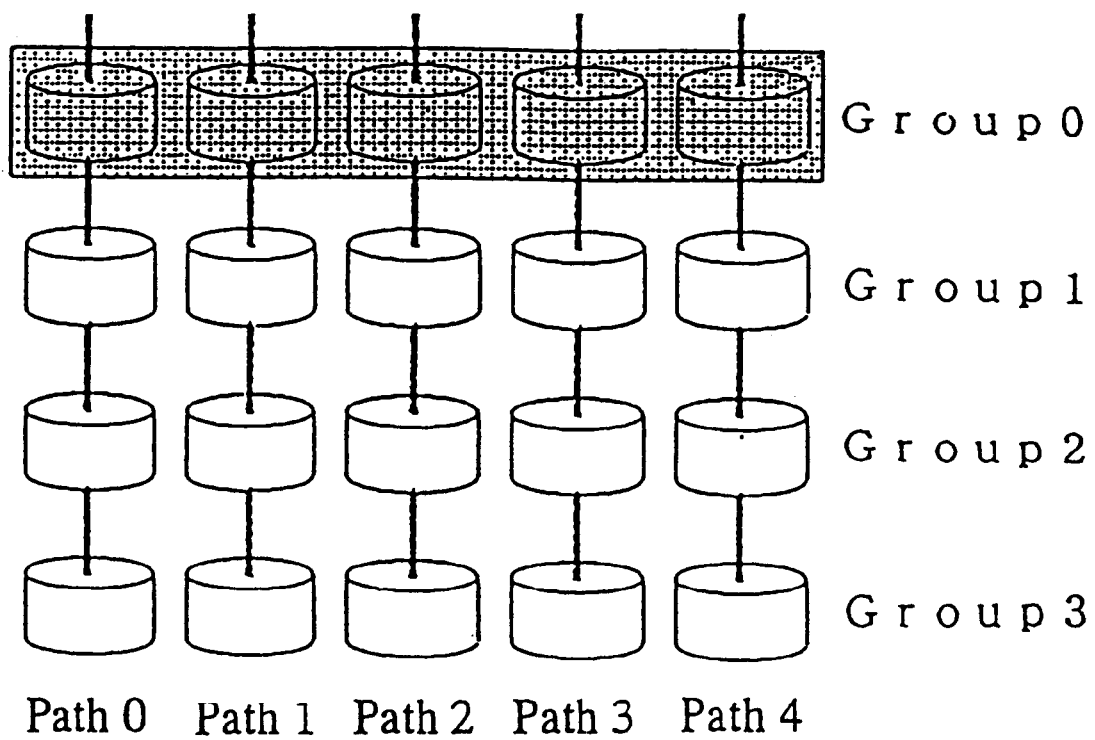
FIG. 8 shows a group of disk units comprising a RAID system.

The disk manager 1 receives RAID level information of FIG. 7A and logic address information for each storage device in the whole RAID system and the Disk Capacity of each group through the RS Port 13 from the disk controller 3 (shown in FIG. 1). This information is stored in the RAID system Configuration table 23f. For example, when the RAID Level is changed from 1 to 3, the HOST system 2 reads the RAID table 22b and changes the RAID Level of Block 9, which is the RAID system configuration table 23f, from RAID Level 1 ('01') to RAID Level 3 ('03'). (The RAID Level is set as shown in FIG. 7B). The RAID table 22b is then rewritten in the operation information storage device 5. Hereby, the RAID Level can be changed. When the RAID group configuration is changed, e.g. from Group 0 to 3 (as shown in FIG. 8) to Group 0 to 2, the HOST system 2 reads a RAID table 22b and changes the RAID Block Depth of Block 9 (which is the RAID system Configuration table 23f) to Group 0 to 2. Then, the RAID table 22b is written back to the operation information storage device 5.

Figure 9:
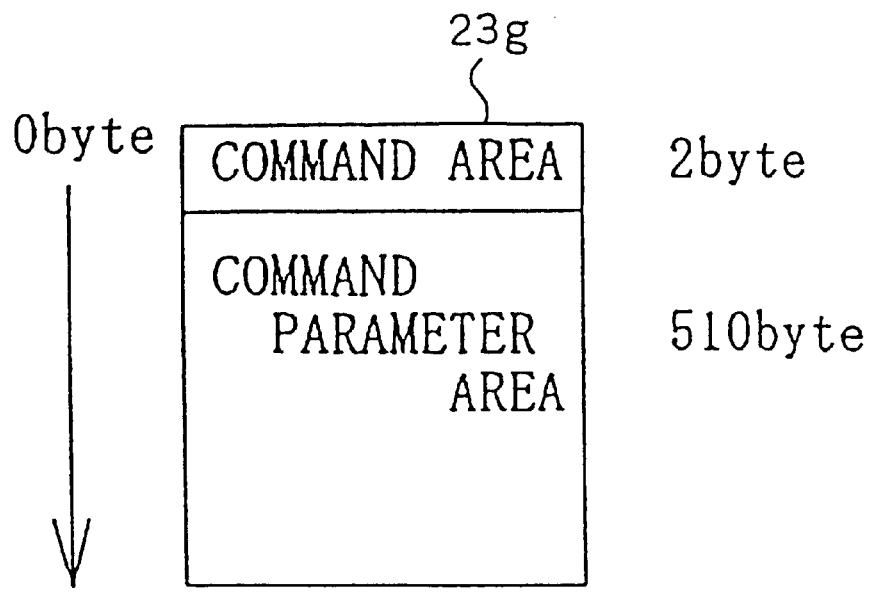
FIG. 9 shows an example of data stored in the RAID control Block.
Figure 10:
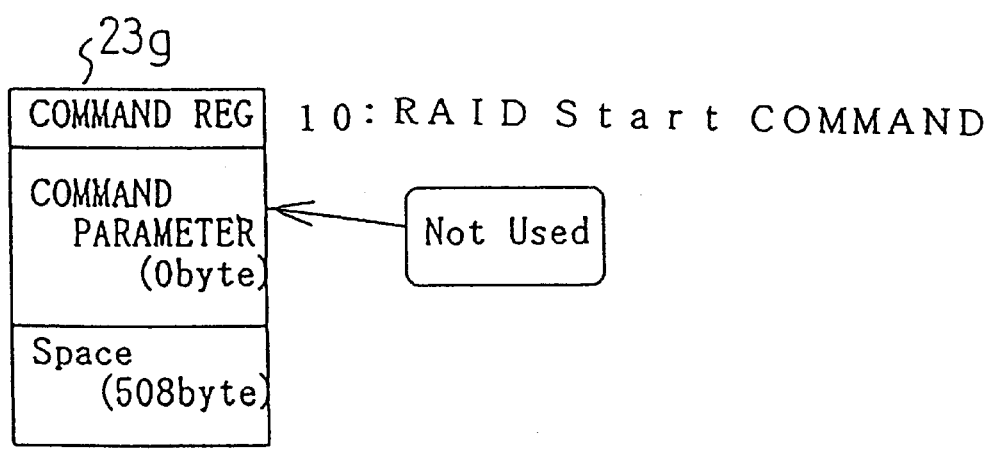
FIG. 10 shows another example of data stored in the RAID control Block.
Figure 11:
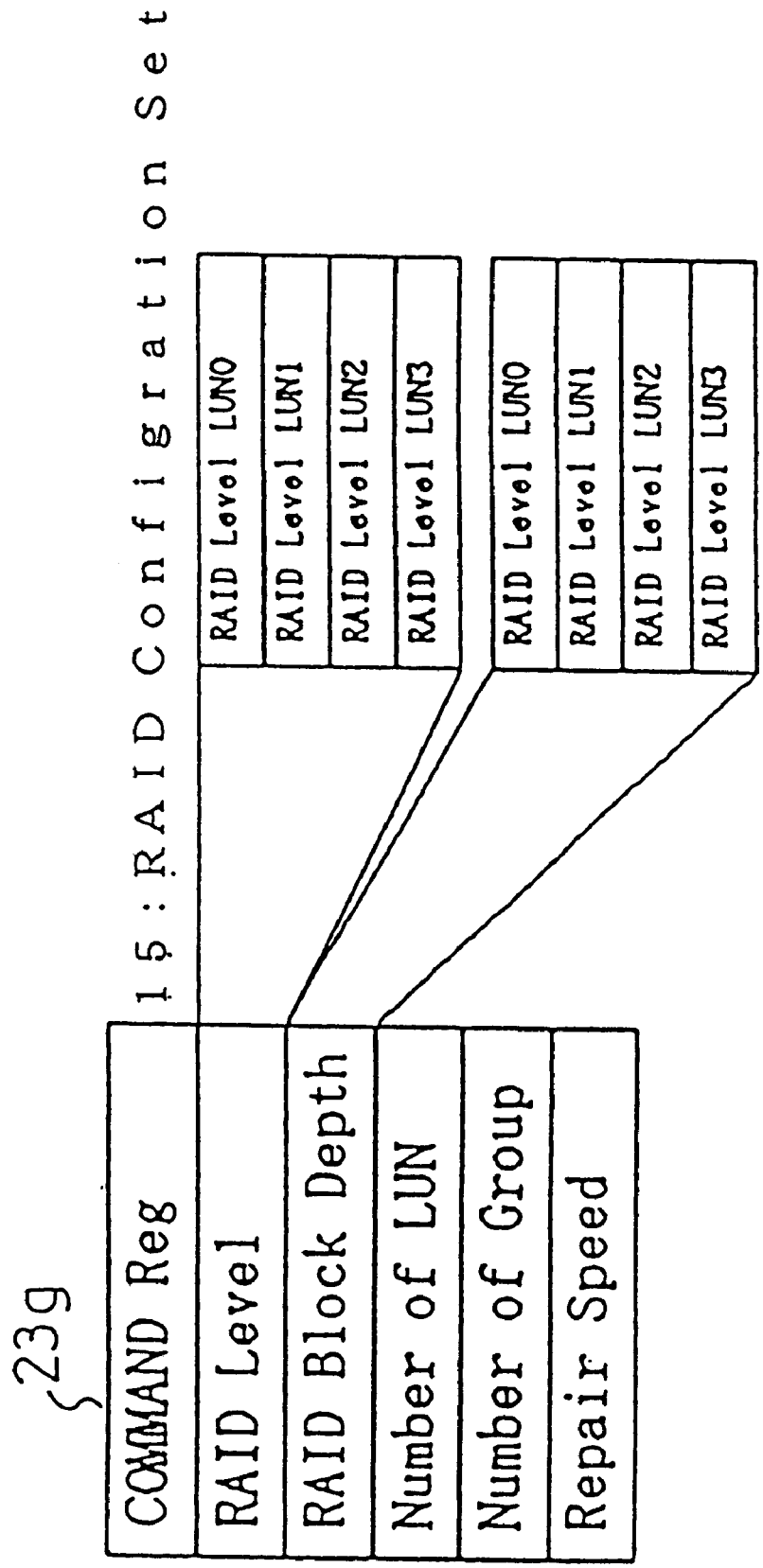
FIG. 11 shows an additional example of data stored in the RAID control Block.
Figure 12:
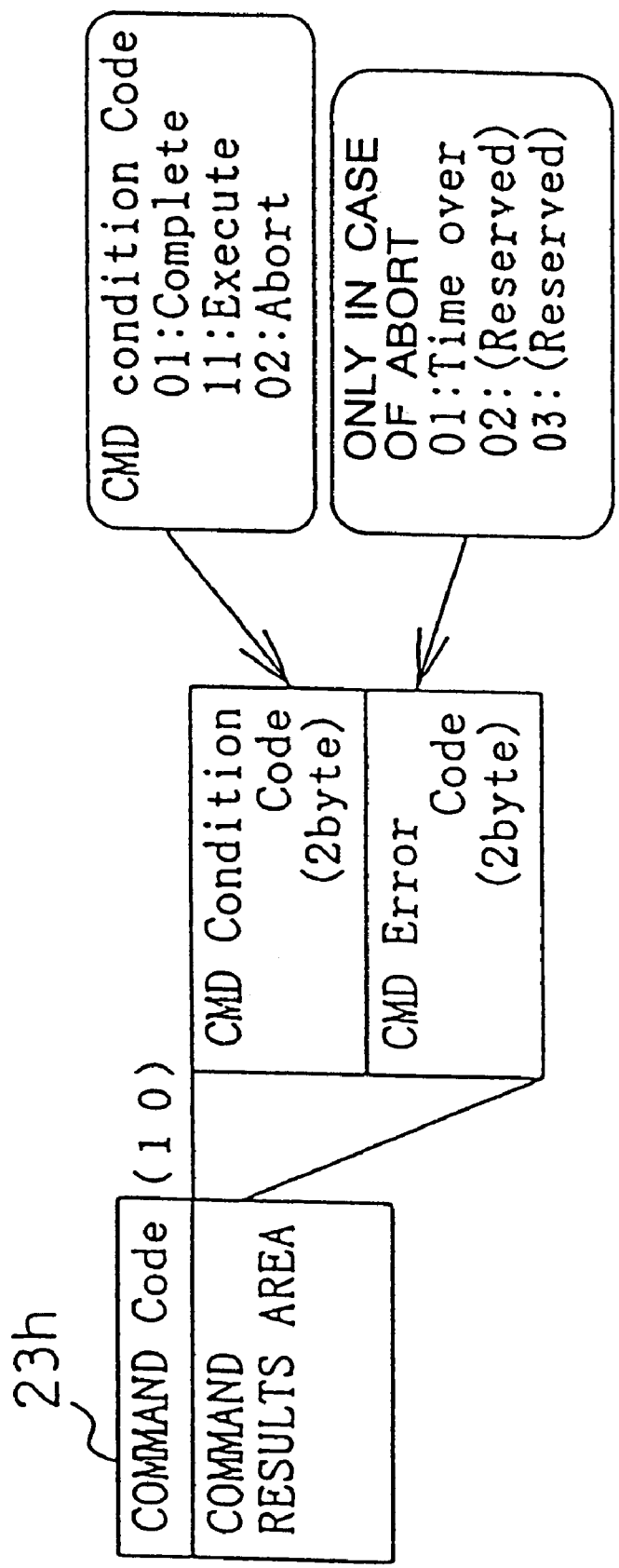
FIG. 12 shows an example of data stored in the RAID control Status.

When control from the HOST system 2 to the RAID system is executed, the HOST system 2 reads the RAID control table 22c and writes information to control the RAID system on Block 16 (which is the RAID control Block 23g) based on the specification of FIG. 9. Then, the RAID control table 22c is rewritten in the operation information storage device 5. For example, when the RAID system is started, the HOST system 2 reads the RAID control table 22c and a COMMAND REG is set to be "10" in the RAID control Block 23g as shown in FIG. 10. Then, the HOST system 2 rewrites the RAID control table 22c on the operation information storage device 5. The disk manager 1 controls the RAID system according to a code set in COMMAND REG of the RAID control Block 23g. Then, a command result is written in the RAID control Status 23h based on specification of FIG. 12. The HOST system 2 reads the RAID control table 22c and by referring to Block 17 (which is the RAID control status 23h) it is then possible to know the status of the starting of the RAID system. In addition, the HOST system 2 can change setting information for the RAID system based on the specification of FIG. 11.

Figure 13:
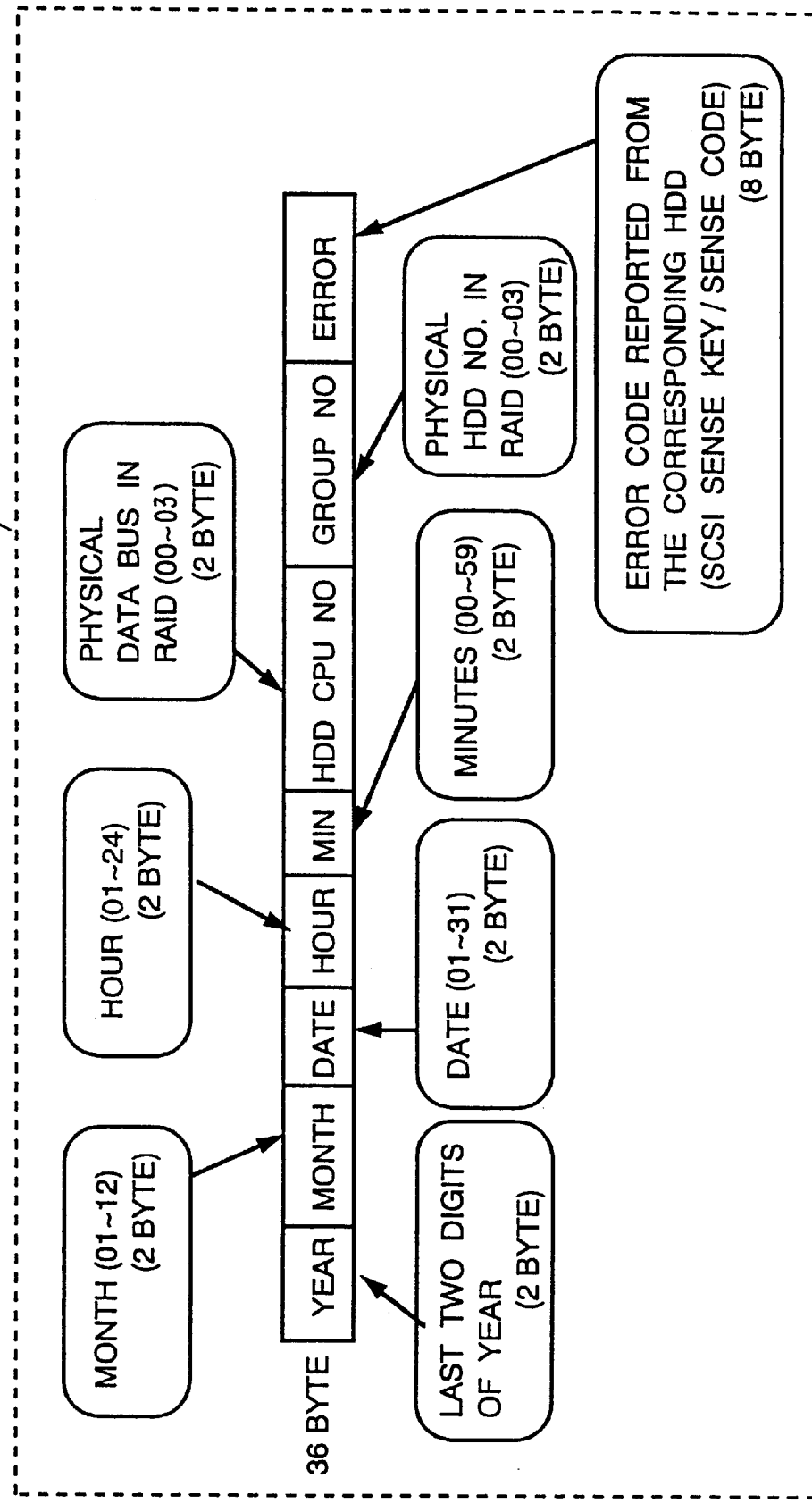
FIG. 13 shows an example of data stored in a log table.

The disk manager 1 stores collected log information based on the specification of FIG. 13. Therefore, the HOST system 2 can refer to the operation status of the RAID system by reading the log table 22d.

An example of accessing the operation information storage device 5 by using a file access command of the operating system on the HOST system 2 is shown in connection with FIG. 14.

Here, for instance, by using "OPEN", "CLOSE", which are access commands used in "Visual C" (a trademark of Microsoft Corporation) language, a "Swap COMMAND" to cease the operation of the disk and a "Spin Up Command" to initiate the operation of the disk are written on the operation information storage device 5 and the storage device that is causing errors is exchanged with another normal disk.

As stated above, the operating system of the HOST system 2 is assumed to be MS-DOS. Accordingly, some drive name, for example, drive A or drive B is assigned to the operation information storage device 5. However, hereinafter, drive names are omitted to designate files.

For instance, referring to FIG. 1, it is assumed that access from the disk controller 3 to the storage device 6 is completed with errors. Then, the error information is transmitted from the disk controller 3 through the RS Port 13 to the disk manager 1. The disk manager 1 writes the received error information in the log table 22d of the operation information storage device 5. The HOST system 2 issues "OPEN ERROR.LOG" (the file name of the log table 22d is assumed to be ERROR.LOG) as shown in (A) of FIG. 14 to the log table 22d of the operation information storage device 5. The "OPEN ERROR.LOG" command is transferred through the SCSI bus 12 and the PCI bus 11 to the disk manager 1. The contents of the log table 22d are transmitted to the memory of the HOST system 2. The HOST system 2 refers to the error information of the log table 22d. If the number of errors exceeds a standard value in the system, it is determined that exchange of the storage device that is causing the errors should be performed. The HOST system 2 then outputs "CLOSE ERROR.LOG" At the same time, in order to cease the operation of the disk causing the errors, "Swap COMMAND" is written on the RAID control Block 23g of the RAID control table 22c as follows.

The HOST system 2 issues a "OPEN COMMAND.FIL" command (the file name of the RAID control table 22c is assumed to be COMMAND.FIL) as shown in (B) of FIG. 14. Thus, the HOST system 2 can obtain the contents of the RAID control table 22c in the memory. The HOST system 2 writes the swap command in the RAID control Block 23g of the RAID control table 22c read in the memory and writes back the RAID control table 22c in the memory of the operation information storage device 5 according to a "CLOSE COMMAND.FIL" command. The swap command is written on the RAID control Block 23g based on the format shown in FIG. 9. A detailed explanation as to how the swap command is written on the RAID control Block 23g is further described below.

First, the HOST system 2 writes "4C" in hexadecimal in "COMMAND AREA" of the RAID control table 22c read in the memory. Here, the swap command is shown as "4C" in hexadecimal code. Next, the HOST system 2 writes the contents of the RAID control table 22c in the memory of the operation information storage device 5 according to a "CLOSE COMMAND.FIL" command. The disk manager 1 detects "Swap COMMAND" written in the RAID control table 22c of the operation information storage device 5 and transmits a command to cease the operation of the spindle to the disk controller 3 through the RS Port 13. The disk manager 1 receives a control status of the disk controller 3 and writes it to the RAID control Status 23h. The HOST system 2 can determine whether control to cease the operation of the spindle is performed normally by referring to the RAID control Status 23h of the RAID control table 22c. A procedure in which the HOST system 2 refers to the RAID control Status 23h is described in more detail below.

The HOST system 2 reads the RAID control table 22c in the memory according to an "OPEN COMMAND.FIL" command as shown in (C) of FIG. 14. The RAID control Status 23h has information with the format of FIG. 12. The HOST system 2 confirms that "4C" is set on "COMMAND CODE" of the RAID control Status 23h read in the memory and confirms that "01" for indicating normal completion is set in "COMMAND RESULTS AREA".

After confirmation, the HOST system 2 issues a "CLOSE COMMAND.FIL" command. Then, the operator exchanges the erroneous storage device with a new storage device.

Next, the HOST system 2 executes the following procedure in order to transmit a command for rotating a spindle of the new exchanged storage device to the disk manager 1.

The HOST system 2 reads a RAID control table 22c into the memory according to an "OPEN COMMAND.FIL" command. Next, a "Spin Up Command" is written on the RAID control Status 23h of the RAID control table 22c read into the memory. That is, as shown in (D) of FIG. 14, "4E" in hexadecimal is written in "Command AREA". Here, "4E" in hexadecimal is a code for showing "Spin Up Command".

Next, a group number and a path number for the storage device for which the spindle is to be rotated are written in the memory. A group number denotes a group of storage devices in a horizontal direction as shown in FIG. 8. A path number denotes a path of storage devices in a vertical direction as shown in FIG. 8. Then, the HOST system 2 writes back the RAID control table 22c in the memory in the operation information storage 5. The disk manager 1 detects that the "Spin Up Command" is written on the RAID control table 22c. Then, the command to rotate the spindle of the corresponding storage device is transmitted to the disk controller 3 through the RS Port 3. After rotating the spindle of the corresponding storage device, the disk controller 3 writes the operation results to the RAID control Status 23h of the RAID control table 22c. The HOST system 2 can determine whether the operation of rotating the spindle finishes normally by referring to the RAID control Status 23h of the RAID control table 22c.

As stated above, the HOST system 2 can directly access the files comprising the operation information storage device 5 by using a file access command of the operating system in the HOST system 2.

Also, as stated above, in a data storage managing method according to the present invention, a file format which can be accessed by a file access command of the operating system in the HOST system is used in the operation information storage device. Conventionally, the HOST system accesses the information being monitored and controlled by the disk manager through a specially prepared driver to control the disk manager; however, by using the present invention, the special driver can be omitted.

Figure 15:
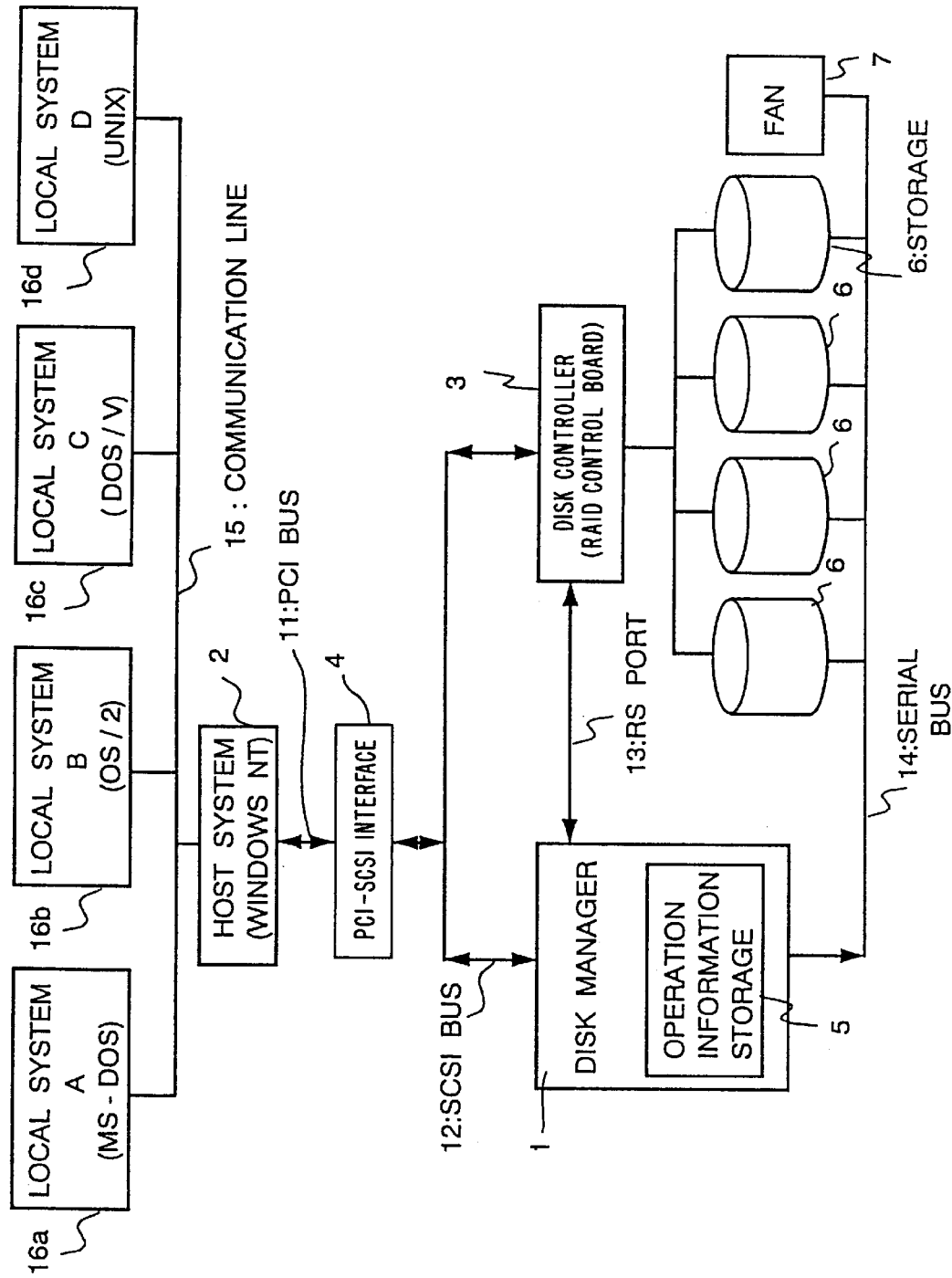
FIG. 15 shows an example of a system configuration which realizes a data storage managing method according to one embodiment of the present invention.

According to an alternate embodiment of the invention, a case is shown where a plurality of local systems are connected to a HOST system in a system configuration of FIG. 1. A case where the local system accesses the operation information storage device through the HOST system is also described. FIG. 15 shows an example of a system configuration which realizes a data storage managing method according to this embodiment.

In FIG. 15, the HOST system 2 carries WINDOWS NT (WINDOWS NT is a registered trademark of Microsoft Corporation) as an operating system. The HOST system 2 connects four local systems 16a to 16d through a communication line 15. A local system 16a uses MS-DOS (MS-DOS is a registered trademark of Microsoft Corporation) as its operating system. The local system 16b uses OS/2 (OS/2 is a registered trademark of International Business Machines Corp.) as its operating system. The local system 16c has DOS/V as an operating system (DOS/V is an operating system developed by IBM Corp.) The local system 16d uses UNIX (UNIX is a registered trademark) as its operating system. Because the other system components of FIG. 15 are the same as those of FIG. 1 discussed above, further explanation is omitted.

For example, the local system 16d transmits the same commands shown in FIG. 14 to the HOST system 2 through the communication line 15. The HOST system 2 then accesses the operation information storage device 5 through the PCI bus 11, the PCI-SCSI interface 4 and the SCSI bus 12. In the case of a Read access, the HOST system 2 transmits the read information through the communication line 15 to the local system 16d.

In the case of a Write access, the HOST system 2 writes information monitored and controlled by the disk manager 1 to the operation information storage device 5 according to the command received from the local system 16d.

In addition, the local system 16d can access the operation information storage device 5 through the HOST system 2 by using a file access command of the operating system carried by the local system 16d. In this case, the HOST system 2 converts the file access command received by the local system 16d to the corresponding command of the operating system in the HOST system 2. It is also possible to convert the file access command transmitted by the local system 16d to the file access command of the operating system of the HOST system 2, using an interface unit (not shown in the Figure) on the communication line 15. In any case, it is possible to access the operation information storage device 5 according to the file access command of the operating system in the local system.

As has been described, when the HOST system connects to the local system and the operating systems of the HOST system and the local system are different, the operation information storage device can be accessed by the file access command of the operating system in each system.

Figure 16:
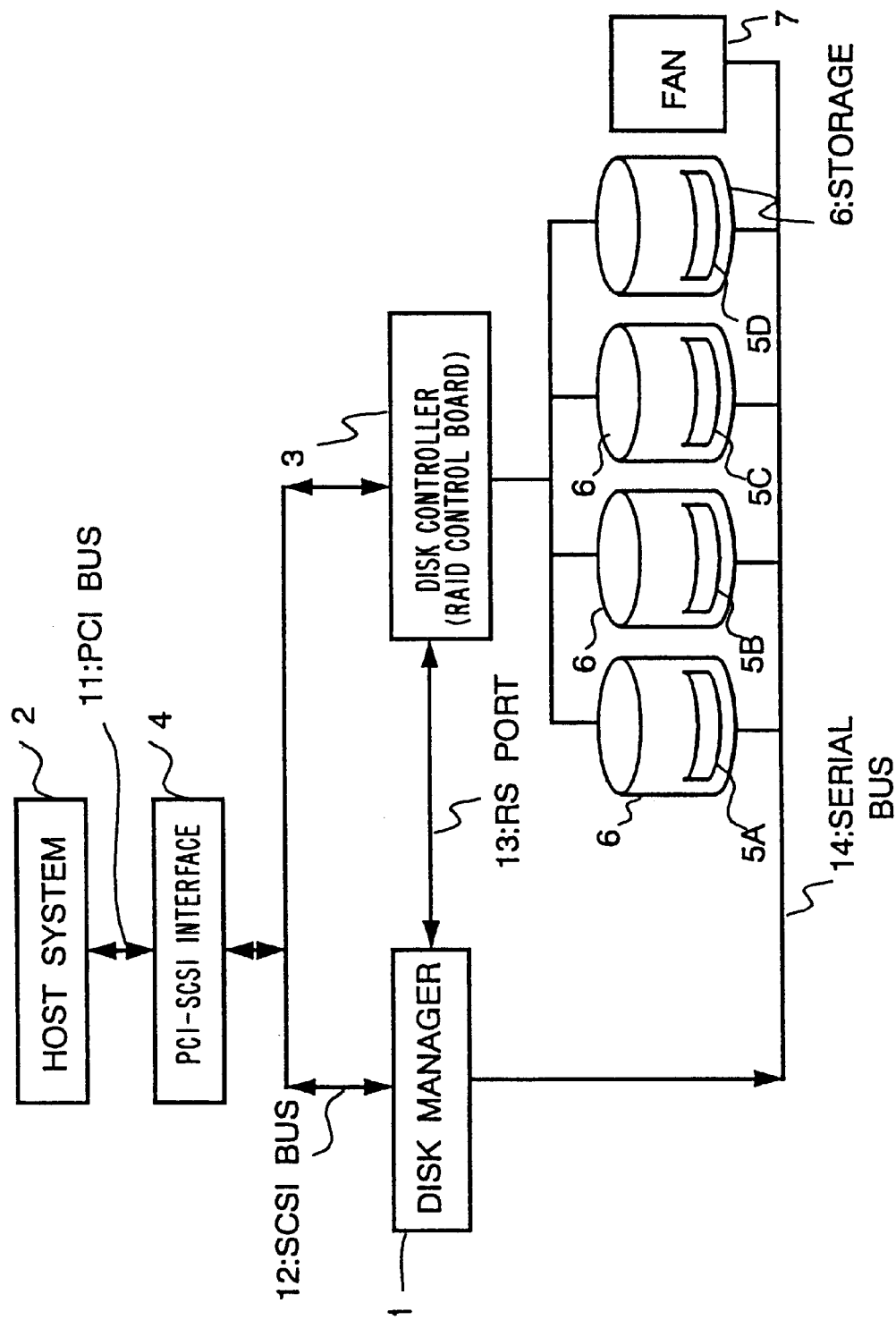
FIG. 16 shows an example of a system configuration which realizes a data storage managing method according to another embodiment of the present invention.

According to another embodiment of the invention, a case where the operation information storage device is provided in the storage devices of the RAID system is described. FIG. 16 shows a view of an example of a system configuration which realizes a data storage managing method of this embodiment.

In FIG. 16, the storage devices 6 use a part of their storage area as operation information storage devices 5a to 5d. The disk manager 1 transmits information stored in the operation information storage devices 5a to 5d through the RS Port 13 to the disk controller 3. The disk controller 3 controls which of the operation information storage devices 5a to 5d stores the information received by the disk manager 1. This control is done by the control operation of the RAID system.

The HOST system 2 accesses the operation information storage devices 5a to 5d according to the same operations for the access to the storage devices 6. The disk controller 3 decides which storage device 6 is to be accessed wherein the desired Block is stored.

When the HOST system 2 of FIG. 16 connects with the local system, the local system can access the operation information storage devices 5a to 5d through the HOST system 2. Which of the operation information storage devices 5a to 5d to be accessed is decided and controlled by the disk controller 3.

As has been described above, even when the operation information storage is provided in the storage means area constituting the RAID system, it can be accessed easily by the file access command of the operating system carried by the HOST system and the local system.

Figure 17:
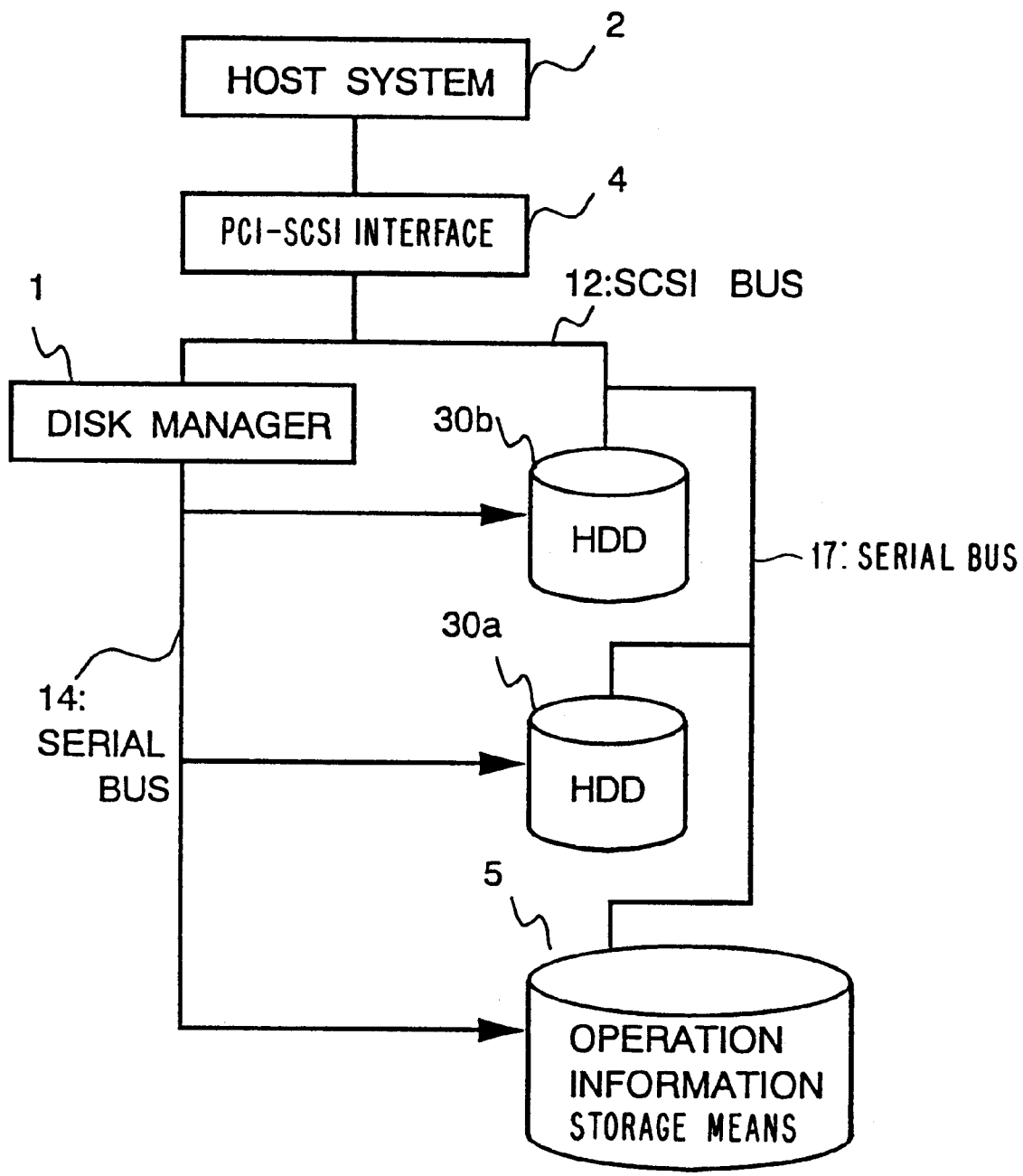
FIG. 17 shows an example of a system configuration which realizes a data storage managing method according to an additional embodiment.
Figure 18:
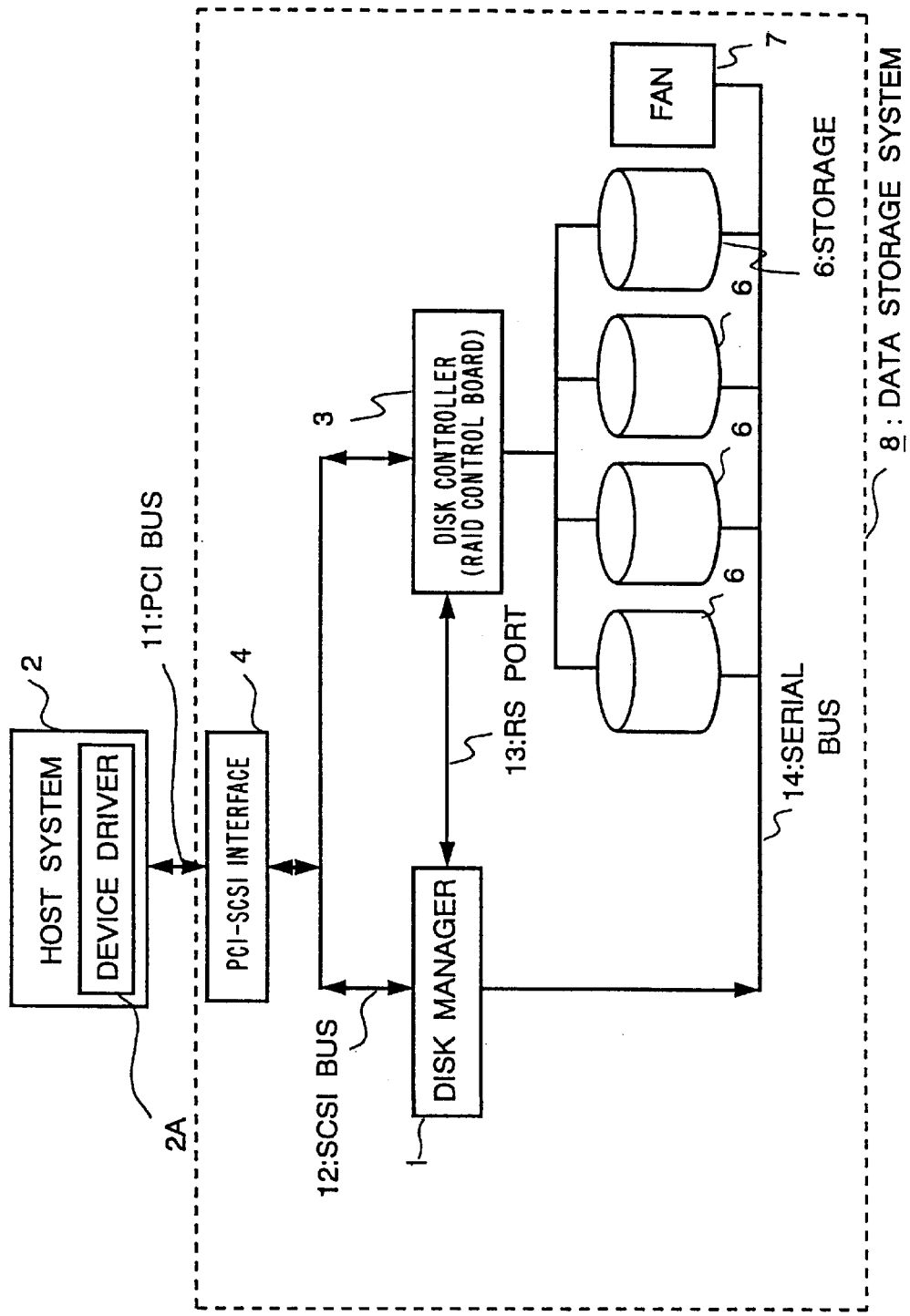
FIG. 18 shows a conventional data storage system.
Figure 19:
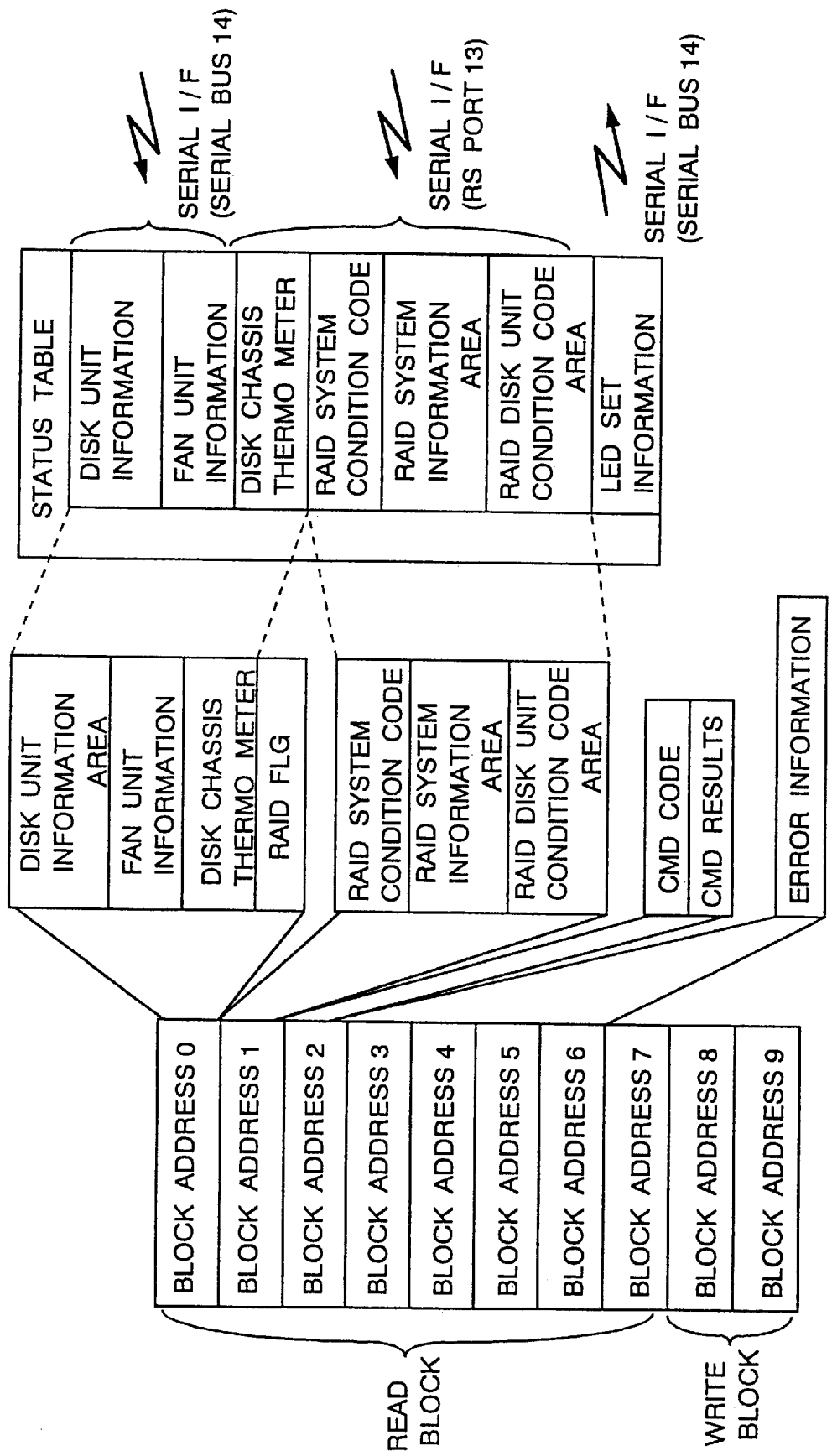
FIG. 19 shows operation information for the storage devices stored by the disk or storage device manager.

An additional embodiment is shown in FIG. 17, where, the disk manager 1, HDDs (Hard Disk Drives) 30a and 30b for data storage, and the operation information storage device 5 to store the operation information are connected to one another without use of the RAID system. Furthermore, the file configuration of the operation information storage device 5 is assumed to be same as that of FIG. 2.

FIG. 17 is an example of the system configuration which realizes a data storage managing method according to the additional embodiment. In FIG. 17, the HOST system 2 is connected through the SCSI bus 12 to the disk manager 1 and the HDD 30a. The disk manager 1 connects the HDD 30a and the HDD 30b and the operation information storage device 5 through a Serial bus 14. A Serial bus 17 connects the HDD 30a, the HDD 30b and the operation information storage device 5 to one another. The disk manager 1 monitors the operation of the HDD 30a and the HDD 30b and stores the monitored information in the operation information storage device 5. The HOST system 2 can refer to the operation information by using file access command of the operating system in the HOST system 2 and accessing the operation information storage device 5. The HOST system 2 stores the information to control the operations of the HDD 30a and the HDD 30b by using the file access command of the operating system in the HOST system 2. The disk manager 1 controls the operation of the HDD 30a and HDD 30b based on the control information stored in the operation information storage device 5. When the HOST system 2 of FIG. 17 connects with the local system, the local system can access the operation information storage device 5 through the HOST system 2.

As has been described, according to the present invention, if one of the storage devices is used as the operation information storage device, it is possible to store the monitored information of the operation of the other storage devices and the information to control the operation of the other storage devices.

In the above first described embodiment, the operation information storage device is configured as shown in FIG. 4. According to this embodiment, the HOST system writes the information to control the storage device in a disk enclosure data table 23c, a RAID system Information table 23e, a RAID system Configuration table 23f, and a RAID control Block 23g. However, it is also possible for the HOST system 2 to write the control information in an area in the operation information storage device 5. In this case, the disk manager 1 controls the operation of the storage devices by referring to this area.

According to another embodiment shown in the system configuration of FIG. 15, the disk manager 1 monitors and controls the operation of the storage devices 6 through the Serial bus 14 by a step of monitoring and controlling the operation of the storage devices 6. Through the RS Port 13 and the disk controller 3, the operation of the storage devices 6 in the RAID system is monitored. Then, the disk manager 1 writes information to monitor the storage devices 6 in the operation information file 21c (FIG. 2) according to a step of storing to the operation information storage device. The HOST system 2 can read the information of the storage devices 6 from the operation information file 21c according to a step of accessing the operation information storage device. This accessing step is called as a step of reading the monitor information of the storage device. The HOST system 2 accesses the operation information file 21c by using the file access command of the operating system in the HOST system 2. The HOST system 2 can write the information to control the operation of the storage devices 6 in the operation information file 21c according to a step of accessing the operation information storage device. This accessing step is called a step of writing the control information of the storage in the operation information storage device. The control information written in the operation information file is executed according to the step of monitoring and controlling the operation of the storage devices by the disk manager 1.

When the HOST system 2 connects to the local systems 16a to 16d through the communication line 15 as shown in FIG. 15, the local systems 16a to 16d can read the information of the storage devices 6 from the operation information file 21c through the HOST system 2 according to the step of accessing the operation information storage device. This accessing step is called a step of reading the monitoring information of the storage devices.

The local systems 16a to 16d use the file access command of the operating system themselves and access the operation information file 21c. When the operating system in the local systems 16a to 16d and the operating system in the HOST system 2 are different, the local systems 16a to 16d can instruct the HOST system 2 to use the file access command of the operating system in the HOST system 2 so that the HOST system 2 accesses the operation information file 21c. The local systems 16a to 16d can write the information to control the operation of the storage devices 6 in the operation information file 21c according to a step of accessing the operation information storage device. This is called a step of writing the control information of the storage device in the operation information storage device. At this time, the local systems 16a to 16d use a file access command of their own operating system and access the operation information file 21c. When the operating system on the local systems 16a to 16d and the operating system on the HOST system 2 are different from one another, the local systems 16a to 16d can instruct the HOST system 2 to use a file access command of the operating system in the HOST system 2 so that the HOST system 2 accesses the operation information file 21c. The disk manager 1 executes the control operation of the operation information written in the operation information file 21c according to a step of controlling the operation of the storage devices.

What is claimed is:

1. A data storage managing system comprising:
   a host system for executing an operating system having a file access command;
   at least one storage device for storing data, connected to the host system through an interface;
   a storage device manager for controlling operation of the at least one storage device and for collecting operation information by monitoring a condition of the at least one storage device; and
   an operation information storage device for storing, the operation information collected by the storage device manager in a file format capable of being accessed by a file access command of the operating system of the host system.

2. The data storage managing system of claim 1, wherein the storage device manager comprises a first interface to receive a file access command from the operating system of the host system and a second interface to connect the at least one storage device to the storage device manager, and wherein the operation information storage device is embodied in the storage device manager and is accessed by the host system through the first interface.

3. The data storage managing system of claim 1, wherein the operation information storage device has at least one of a read only area and a write only area for the file access command of the operating system of the host system.

4. The data storage managing system of claim 1, wherein the operation information storage device stores the operation information in a Microsoft® Disk Operating System (MS-DOS®) file format.

5. The data storage managing system of claim 1, wherein the operation information storage device stores the operation information in a UNIX® file format.

6. The data storage managing system of claim 1, wherein the operation information storage device comprises a non-volatile memory.

7. The data storage managing system of claim 1, wherein the at least one storage device comprises a first interface to receive the file access command from the operating system of the host system, and a second interface to connect the at least one storage device to the storage device manager, and wherein the operation information storage device is embodied in a part of the at least one storage device and is accessed through the first interface by the host system.

8. The data storage managing system of claim 7, wherein the first interface is a small computer system interface, and wherein the operation information storage device stores a small computer system interface block for storing information being used to control the small computer system interface in the file format capable of being accused by the file access command of the operating system of the host system.

9. The data storage managing system of claim 1, further comprising at least one local system, connected through a communication line to the host system, wherein the at least one local system executes an operating system having a file access command, and the at least one local system instructs the host system through the communication line to access the operation information storage device according to the file access command of the operating system of the at least one local system.

10. The data storage managing system of claim 9, wherein the host system accesses the operation information storage device based on an instruction from the at least one local system.

11. The data storage managing system of claim 9, wherein the at least one local system reads the operation information from the operation information storage device according to the file access command of the operating system of the at least one local system through the host system, and the at least one local system writes control information to control the operation of the at least one storage device in the operating information storage device according to the file access command of the operating system of the at least one local system through the host system.

12. The data storage managing system of claim 1, wherein the operation information storage device stores control information to control operation of the at least one storage device in addition to the operation information of the at least one storage device.

13. The data storage managing system of claim 12, wherein the host system reads the operation information from the operation information storage device according to the file access command of the operating system of the host system, and wherein the host system writes the control information to control the operation of the at least one storage device in the operation information storage device according to the file access command of the operating system of the host system.

14. The data storage managing system of claim 13, wherein the storage device manager controls the operation of the at least one storage device based on the control information written to the operation information storage device by the host system.

15. The data storage managing system of claim 14, wherein the storage device manager writes a result of the operation of the at least one storage device based on the control information written in the operation information storage device.

16. In a system including a host system, a storage device manager connected to the host system, and at least one storage device are connected to the storage device manager, a data storage managing method, for managing the at least one storage device and storing information in an operation information storage device, the method comprising steps of:

monitoring and controlling the operation of the at least one storage device by the storage device manager;

storing monitoring and control information by which the storage device manager monitors and controls the operation of the at least one storage device in the operation information storage device in a file format which can be accessed by a file access command of an operating system of the host system; and accessing the operation information storage device according to the file access command of the operating system of the host system.

17. The data storage managing method of claim 16, wherein the step of accessing the operation information storage device comprises the steps of reading the monitoring information of the at least one storage device from the operation information storage device and writing the control information of the at least one storage device in the operation information storage device.

18. The data storage managing method of claim 16, wherein the host system is connected to at least one local system through a communication line wherein the at least one local system executes an operating system having a file access command, and the data storage managing method further comprises a step of accessing the operation information storage device through the communication line according to the file access command of the operation system executing on the at least one local system.

19. The data storage managing method of claim 18, wherein the step of accessing the operation information storage device comprises the steps of reading the monitoring information of the at least one storage device from the operation information storage device through the host system and writing the control information of the at least one storage device to the operation information storage device through the host system.

20. The data storage managing method of claim 18, wherein the step of accessing the operation information storage device comprises a step of controlling the operation of the at least one storage device based on the control information written to the operation information storage device by the storage device manager.

* * * * *